A. W. AND J. N. MARTIN.
GREASE CUP.
APPLICATION FILED APR. 12, 1919.
1,337,717.
Patented Apr. 20, 1920.
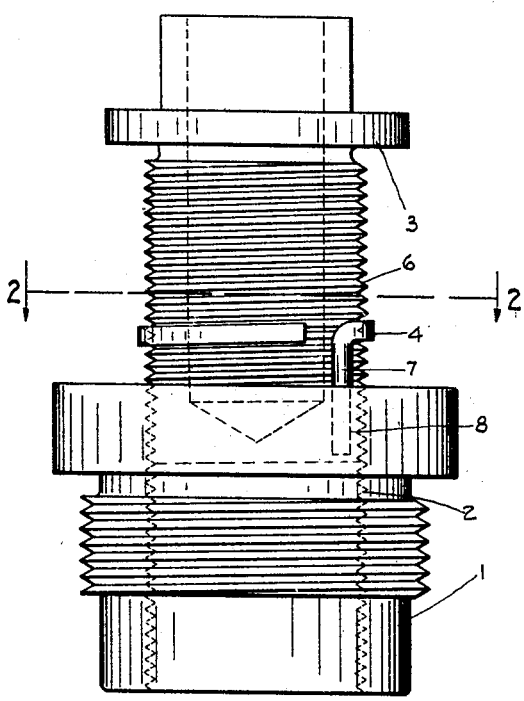
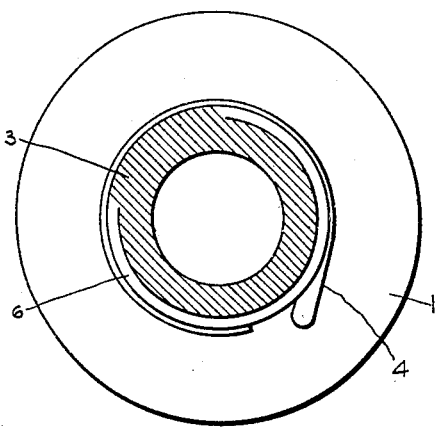
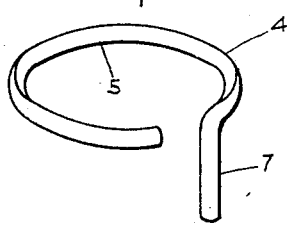
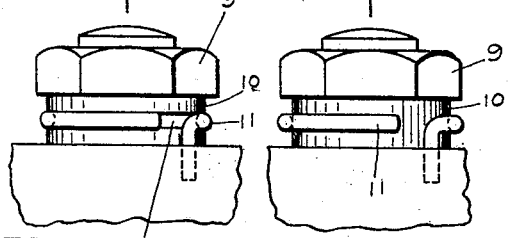
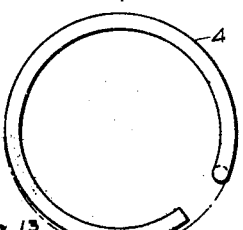
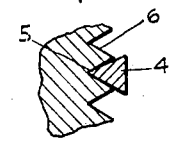
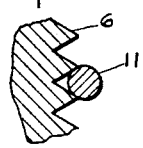
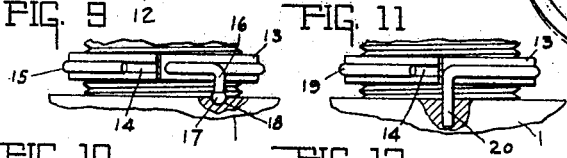
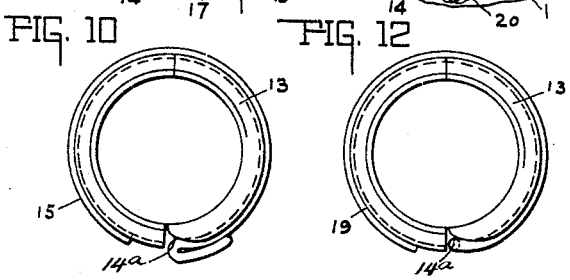
INVENTOR.
ALBERT W. MARTIN.
JACOB N. MARTIN.
BY
ATTORNEYS

UNITED STATES PATENT OFFICE.

ALBERT WM. MARTIN, OF INDIANAPOLIS, AND JACOB N. MARTIN, OF BEECH GROVE, INDIANA.

GREASE-CUP.

1,337,717.   Specification of Letters Patent.   Patented Apr. 20, 1920.

Application filed April 12, 1919. Serial No. 289,693.

*To all whom it may concern:*

Be it known that we, ALBERT W. MARTIN and JACOB N. MARTIN, citizens of the United States, and residents of Indianapolis and Beech Grove, respectively, county of Marion and State of Indiana, have invented a certain new and useful Grease-Cup; and we do hereby declare that the following is a full, clear, and exact description thereof, reference being had to the accompanying drawings, in which like numerals refer to like parts.

This invention relates to grease cups, and primarily to that class adapted to be used in connection with locomotives for containing grease for oiling moving parts of the locomotive.

A feature of the invention is the provision of a locking ring for manually holding the rotating part of the grease cup against reverse rotation with respect to the stationary portion of the grease cup, and at the same time permitting free rotation of the movable part when turned in to the stationary part of the cup.

A further feature of the invention is the provision of means for holding the locking member stationary with respect to the fixed part of the grease cup.

Other objects and advantages will be hereinafter more fully set forth and pointed out in the accompanying specification.

In the accompanying drawings, which are made a part of this application, Figure 1 is an elevation of a grease cup showing the locking mechanism applied thereto. Fig. 2 is a sectional view thereof as seen on line 2—2 of Fig. 1. Fig. 3 is a perspective view of the locking mechanism removed from the cup. Fig. 4 is a top plan view thereof. Fig. 5 is a detail sectional view through the locking mechanism and a part of the grease cup. Fig. 6 is a similar view showing a slightly modified form of locking member. Figs. 7 and 8 are side elevations of modified forms of means for locking nuts on bolts or the like. Fig. 9 is a side elevation. Fig. 10 is a top plan view of a further modified form of structure. Fig. 11 is a side elevation. Fig. 12 is a top plan view of a still further modified form of structure.

Referring to the drawings, in which similar reference numerals designate corresponding parts throughout the several views, 1 indicates the bowl of a grease cup into which grease is to be packed to be fed on to moving bearing parts, and may be of the ordinary construction, said bowl having an internally threaded bore 2 into which is turned a feed plunger, which is exteriorly threaded and adapted to turn into the bore 2 to force the grease downwardly in the bowl and gradually feed the same on to the bearing parts.

In grease cups of this class it is customary to pack the bowl of the grease cup with solidified grease and then introduce the feed plunger into the outer end of the bearing 2, and turn the same inwardly until the end thereof comes in contact with the grease, and as the greater portion of the feed plunger is left projecting out of the bowl of the grease cup, when the cup is first packed with grease, the vibration of the parts to which the grease cup is attached tends to loosen or unscrew the feed plunger, so that it becomes lost, thus entailing a great deal of expense in replacing the same, as well as interfering with the proper lubricating effects of the grease cup. As the lubricant becomes liquefied, created by the friction between the bearing parts and feeds from the bore of the bowl, the feed plunger is given additional turns to move the same inwardly and keep the solid portion of the grease fed down to the point of discharge from the bowl. In view of the fact that the vibration of the parts to which the grease cup is attached tends to loosen the feed plunger, and also to the fact that said plunger must be turned down into the bowl of the cup at intervals, a locking means is provided for the feed plunger which will prevent casual reverse rotation thereof, but will permit the plunger to freely rotate when being turned into the bowl portion of the grease cup.

This locking means comprises a split ring 4 which is preferably constructed from a piece of wire or similar metal, and if desired the inner face thereof may be made wedge shaped so as to provide a tapered edge 5, which tapered edge enters between the threads 6 on the exterior of the feed plunger 3, and by arranging one end of the split rings slightly eccentric to the remaining portion thereof, said end will bind against the face of the feed plunger 3 and grip the surface thereof with sufficient force to prevent casual reverse rotation of the plunger, but will expand when the plunger is rotated in the opposite direction and permit the plunger to freely rotate.

In order to hold the locking rings 4 against rotation, the end thereof opposite the eccentrically arranged end is provided with a laterally extending shank 7 which enters a seat 8 in the end face of the bowl 1. The shank, when entered in the seat, holds the locking ring against rotation while the feed plunger is being operated. As best shown in Figs. 6, 7 and 8 the locking ring may be circular in cross section if desired, the operation thereof being the same as with the other form, and instead of using the locking ring for holding the feed plunger of a grease cup, it may be used for locking nuts on the ends of bolts or for similar purposes. When used for locking nuts in engagement with bolts, the nuts 9 are preferably provided with extensions 10, around which the locking rings 11 extend, and as shown in Fig. 7 the face of the extension may be provided with a circular groove 12, or as best shown in Fig. 8 the extension may be left smooth throughout its length.

In applying the locking device to use, after a prescribed quantity of grease has been packed in the bowl 1, the shank 7 of the locking ring is introduced into the seat 8 and the body portion of the ring swung until it is brought into registration with the bore in the grease cup. The feed plunger 3 is then threaded through the locking ring and into the bore of the bowl, and as this movement of the feed plunger causes the locking ring to expand the plunger may be readily turned in this direction. On reversing the rotation of the feed plunger, however, the locking ring will be contracted, owing to the frictional engagement of the eccentrically arranged end of the locking ring with the face of the plunger, such frictional contact holding the feed plunger against casual reverse rotation and requiring the use of a wrench or similar instrument for reversely rotating the plunger.

It will, therefore, be readily seen that the locking ring will positively hold the feed plunger against reverse rotation, consequently preventing the vibration of the parts to which the grease cup is attached from loosening the feed plunger, and consequently obviating the possibility of losing the plunger. It will likewise be seen that this device can be very cheaply constructed, and that the same will last indefinitely as it is not necessarily subjected to severe strain from use, and furthermore that should the locking ring become lost or broken the cost of replacing the same would be very slight.

It will likewise be seen that after the locking ring has once been applied to the feed plunger it may be left in engagement with the feed plunger when the plunger is removed from the bowl of the grease cup, as the locking ring is still in threaded engagement with the plunger after the plunger has been released from the bowl of the grease cup, consequently the shank of the locking ring may be disengaged from the socket in the bowl of the grease cup and remain in engagement with the plunger, therefore, it will not become lost or misplaced.

In Figs. 9 and 10 a collar 13 is provided which is preferably formed in sections and internally threaded to engage the threads on the plunger 3 and in the edge of the member 13 is formed a channel 14 for the reception of the locking ring 15 and a notch 14$^a$. One end of the ring 15 is bent back upon itself to form a spring arm 16 which seats in the notch 14$^a$ and is extended downwardly, its free end 17 being enlarged and preferably spherical for interlocking in the recess 18 in the upper face of the pawl 1, the engagement of said spherical free end with the recess holding the ring and member 13 against rotation with respect to the pawl. In Figs. 11 and 12, the locking ring 19 is provided with a straight downwardly extending section 20 which enters a socket or recess formed in the end of the pawl 1 for holding the ring member 19 against rotation. The object in providing the member 13 is to obviate any possibility of the locking ring injuring the threads of the member 3, the operation of the locking ring being the same as shown in the other form, the split member 13 locking with the member 3 while the split ring 15 interlocks with the member 13, thus giving the same locking effect as when the locking ring is engaged directly with the face of the member 3, but obviates the possibility of injuring the threads on the member 3.

The invention claimed is:

1. In a grease cup construction including a stationary part, and a rotating part having threads thereon to engage in said stationary part to seat the former, of a split locking ring substantially circular and surrounding said rotating part and slidably seatable in a thread thereof to frictionally engage the threaded surface of said rotating part, the free end of said ring being normally and slidably seatable in said thread to permit free rotation of said rotating part in one direction, to prevent casual rotation thereof in a reverse direction and to permit intentional rotation in the reverse direction, the other end of said locking ring being suitably and eccentrically secured with respect to said circular portion thereof to the stationary part adjacent said rotating part to anchor the ring thereto.

2. In a grease cup construction, including a bowl of a grease cup and a feed plunger adapted to be turned into said bowl, the combination of a collar surrounding said plunger and having corresponding threads thereon, the outer surface of said collar having an annular and a longitudinal recess therein, of a split locking ring adapted to surround said collar and be seatable in said annular recess, one end of said ring being adapted for frictional engagement with said collar to hold the same and the plunger against casual rotation, the other end of said ring having a downwardly extending portion seatable in said longitudinal recess, and means for anchoring the downwardly extending portion of said ring to the bowl of the grease cup for holding the ring against rotation with the collar and plunger.

In witness whereof, we have hereunto affixed our signatures.

ALBERT WM. MARTIN.
JACOB N. MARTIN.